(12) United States Patent
Hallahan et al.

(10) Patent No.: US 6,814,863 B2
(45) Date of Patent: Nov. 9, 2004

(54) RADIAL FLOW SEPTIC TANK

(76) Inventors: Dennis F. Hallahan, 3 Littlefield La., Old Lyme, CT (US) 06371; Stephen P. Dix, 2 Count La., Old Lyme, CT (US) 06371

( * ) Notice: Subject to any disclaimer, the term of this patent is extended or adjusted under 35 U.S.C. 154(b) by 47 days.

(21) Appl. No.: 10/206,571

(22) Filed: Jul. 26, 2002

(65) Prior Publication Data

US 2004/0016695 A1 Jan. 29, 2004

(51) Int. Cl.$^7$ .............................................. B01D 21/00
(52) U.S. Cl. ....................... 210/299; 210/457; 210/519; 210/532.2
(58) Field of Search ................................ 210/299, 519, 210/528, 532.1, 532.2, 534, 457, 489, 497.01

(56) References Cited

U.S. PATENT DOCUMENTS

| | | | | |
|---|---|---|---|---|
| 978,889 A | * | 12/1910 | Imhoff | 210/532.2 |
| 1,343,764 A | * | 6/1920 | Clifford | 210/519 |
| 1,887,177 A | * | 11/1932 | Adams | 210/519 |
| 2,605,220 A | * | 7/1952 | Logan | 210/532.2 |
| 2,743,018 A | * | 4/1956 | Belgarde | 210/457 |
| 2,834,471 A | * | 5/1958 | Gibson | 210/532.2 |
| 3,216,570 A | * | 11/1965 | Cunetta | 210/528 |
| 3,262,565 A | * | 7/1966 | Silverwater | 210/457 |
| 3,353,676 A | * | 11/1967 | Hirsch | 210/519 |
| 3,486,628 A | * | 12/1969 | Darby | 210/528 |
| 3,830,373 A | * | 8/1974 | Sixt | 210/497.01 |
| 4,132,643 A | * | 1/1979 | Hellqvist | 210/532.2 |
| 4,180,464 A | * | 12/1979 | Beane | 210/497.01 |
| 4,188,154 A | * | 2/1980 | Izatt | 405/43 |
| 4,367,048 A | * | 1/1983 | Morita | 210/528 |
| 4,994,179 A | * | 2/1991 | Keeter et al. | 210/534 |
| 4,994,182 A | * | 2/1991 | Noiron et al. | 210/528 |
| 5,423,986 A | * | 6/1995 | Valentin | 210/519 |
| 5,580,453 A | * | 12/1996 | Nurse, Jr. | 210/457 |
| 5,683,577 A | * | 11/1997 | Nurse, Jr. | 210/532.2 |
| 5,840,182 A | | 11/1998 | Lucido et al. | |
| 5,840,196 A | | 11/1998 | Laurent | |
| 6,267,882 B1 | | 7/2001 | Houck et al. | |
| 6,270,661 B1 | | 8/2001 | Jowett | |
| 6,280,614 B1 | | 8/2001 | Berg et al. | |
| 6,287,469 B1 | | 9/2001 | Ashburn et al. | |
| 6,290,429 B1 | | 9/2001 | Presby | |
| 6,296,775 B1 | | 10/2001 | Moody et al. | |
| 6,309,539 B1 | | 10/2001 | Mayer | |
| 6,319,403 B1 | | 11/2001 | Meyers | |
| 6,319,408 B1 | | 11/2001 | Zebuhr | |
| 6,328,890 B1 | | 12/2001 | Thibault | |
| 6,464,865 B2 | * | 10/2002 | Tipton et al. | 210/532.2 |

FOREIGN PATENT DOCUMENTS

| | | |
|---|---|---|
| WO | 01/58814 | 8/2001 |
| WO | 01/70370 | 9/2001 |

OTHER PUBLICATIONS

CK Ventures Ltd, Nayadic Advanced Aerobic Treatment Plants, pp 1–3, date unknown.
NDS—Drainage Materials & Appl.; Feb. 2, 2004.
Department of Ecology; Drainage System Components, Feb. 2, 2004.

* cited by examiner

*Primary Examiner*—Christopher Upton
(74) *Attorney, Agent, or Firm*—Cantor Colburn LLP

(57) ABSTRACT

A radial flow septic tank includes: a main body having a wall and a floor defining a cavity; an inlet disposed at approximately a center of the cavity; an outlet having a collection device disposed around an inside perimeter of the wall of the main body; and a column disposed within the cavity at approximately the center of the main body, the column having openings to allow the flow to move from the inlet to the outlet.

18 Claims, 3 Drawing Sheets

RADIAL FLOW SEPTIC TANK

BACKGROUND OF THE INVENTION

Wastewater treatment for an individual home, small group of homes, or commercial facilities can be effectively treated by a traditional system of a septic tank and a leachfield. Typically, septic tanks slow down and temporarily retain wastewater so that treatment can occur. As sewage enters the tank, solids separate from fluids and settle to the bottom or float to the top. Anaerobic bacteria break the solids down to reduce the volume. Septic tanks are typically shaped as a rectangular box with effluent entering at one end and then flowing laterally through the tank and discharging at the opposite end.

In particular, as wastewater enters the septic tank, it separates into one of three distinct layers in the tank. The top layer is referred to as the scum layer. This layer includes components of the effluent such as oils, grease and fats, cigarette filters, and other substances that are lighter than water. The middle layer is referred to as the clear layer. The lighter scum layer will float over the clear layer. The clear layer comprises mostly liquids with suspended solids. Bacteria can digest some of the suspended solids within this layer. The partially treated, clarified effluent from this layer will discharge to the leachfield for final treatment. The bottom layer is referred to as the sludge layer. This layer contains most of the sewage solids and is generally oxygen free. Anaerobic bacteria reduce the volume of solids in this layer greatly, but not entirely.

Septic tanks can treat effluent to a higher level if the settling capacity of the tank was improved. One method to improve the tank's settling capacity is to lower the effluent velocity through the tank. The slower velocity allows the more time for the solids to settle out of the wastewater. Thus, a septic tank that allows for a slower velocity would improve the performance of the septic tank and allow for better treatment of the wastewater.

BRIEF DESCRIPTION OF THE INVENTION

Disclosed herein is a radial flow septic tank and a method for use thereof. In an exemplary embodiment of the invention, the radial flow septic tank includes: a main body having a wall and a floor defining a cavity; an inlet disposed at approximately a center of the cavity; an outlet having a collection device disposed around an inside perimeter of the wall of the main body; and a column disposed within the cavity at approximately the center of the main body, the column having openings to allow the flow to move from the inlet to the outlet.

BRIEF DESCRIPTION OF THE DRAWINGS

Referring to the exemplary drawings wherein like elements are numbered alike in the several Figures.

DETAILED DESCRIPTION

Figure 1:
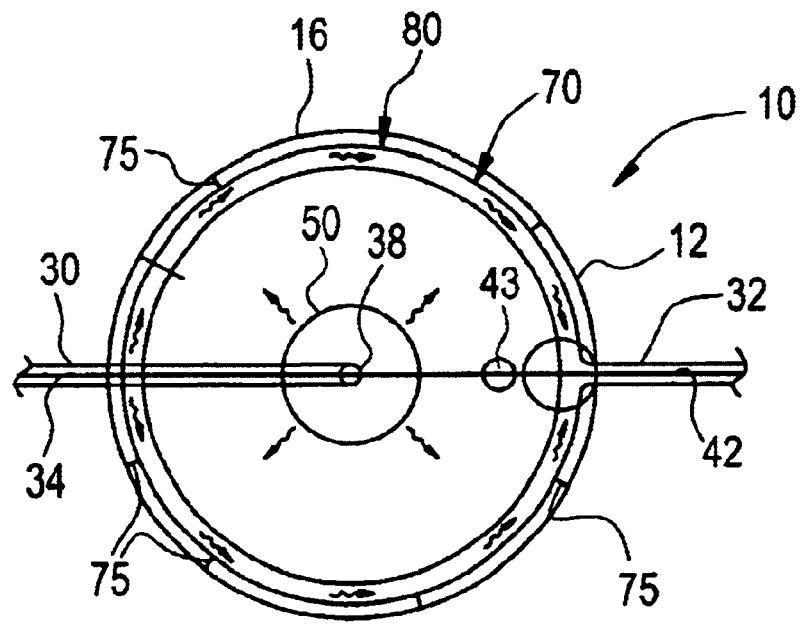
FIG. 1 is plan view of a radial flow septic tank.
Figure 2:
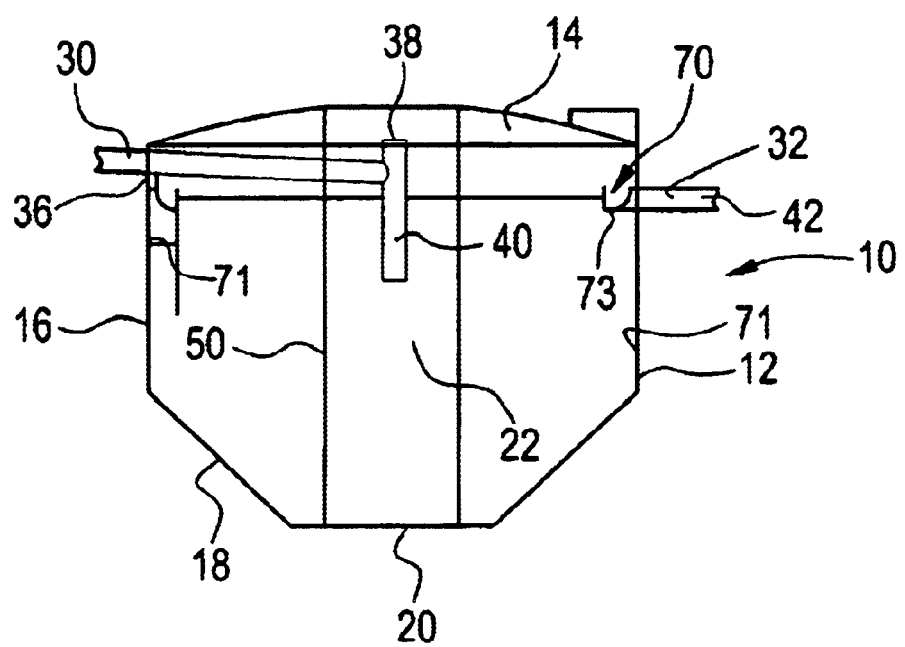
FIG. 2, is a cross-sectional view of the radial flow septic tank.

Referring to FIGS. 1 and 2, a radial flow septic tank 10 is illustrated. Radial flow septic tank 10 has a main body 12 and a cover 14. Main body 12 and cover 14 are preferably circular in shape; however, main body 12 and cover 14 may also be octagonal or similar type shape. Main body 12 has a wall 16, a sloping bottom wall 18, and a floor 20. Wall 16 is preferably slightly angled to allow for main body 12 to be stacked during shipping. Sloping bottom wall 18 controls the location of the accumulation of solids and also confines gas production location. Floor 20 is generally flat and allows for accumulation of solids. Wall 16, sloping bottom wall 18, and floor 20 define a cavity 22 within main body 12. Main body 12 and cover 14 are preferably made from plastic, but may also be made from materials such as fiberglass, concrete, nylon, or the like.

Radial flow septic tank 10 has an inlet 30 and an outlet 32. Inlet 30 includes an inflow pipe 34 that enters main body 12 at a top 36 of wall 16 and travels to approximately a center 38 of main body 12. At center 38, inflow pipe 34 is coupled to a center inflow discharge pipe 40, which extends vertically downward into cavity 22 and allows wastewater to flow into cavity 22. Inflow discharge pipe 40 extends down from top 36 of wall 16 to at least below the scum level of main body 12. In an exemplary embodiment, inflow discharge pipe 40 extends approximately one quarter to one half into cavity 22. Outlet 32 is located at wall 16 and includes an outlet pipe 42 that leads to a leachfield (not shown).

Cover 14 may have access ports 43 that allow an operator to access both inlet 30 and outlet 32. Such access aids in the maintenance, cleaning, and pumping of the tank.

Radial flow septic tank 10 also includes a radial flow column 50 that is located within cavity 22 at center 38 of main body 12 and surrounds center inflow discharge pipe 40. Radial flow column 50 may extend from either cover 14 or floor 20. In an exemplary embodiment, radial flow column 50 extends from cover 14 to floor 20 through a middle portion of cavity 22. By having radial flow column 50 extend from cover 14 to floor 20, radial flow column 50 can also function as a structural support to cover 14.

Figure 3:
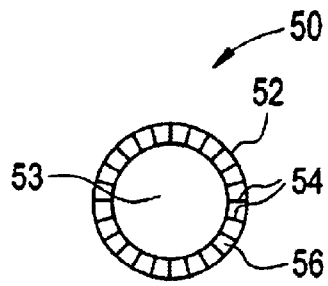
FIG. 3 is a plan view of a radial flow column of the radial flow septic tank of FIG. 1.
Figure 4:
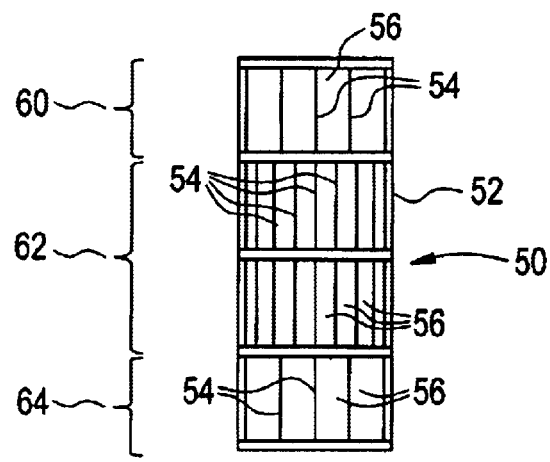
FIG. 4 is a side view of the radial flow column of FIG. 3.

Referring to FIGS. 3–4, radial flow column 50 is illustrated in more detail. Radial flow column 50 includes a member 52 that is generally circular with a hollow center 53. Member 52 includes fins 54 that have an open slot area 56 between each fin 54 to allow for the wastewater to radially flow from center 53 to wall 16 (see FIG. 1).

In an exemplary embodiment, radial flow column 50 includes a first zone 60, a second zone 62, and a third zone 64, which correspond to the three layers that occur as a result of the wastewater being treated in a septic tank. First zone 60 is located at the top of radial flow column 50, which is the layer in which grease and scum accumulate. Fins 54 of first zone 60 are spaced apart to allow for larger open slot areas 56, which allows for removal of the grease and scum. Second zone 62 is located at the middle of radial flow column 50, which is the clear layer of the wastewater. Second zone 62 has the least amount of solids and as such, fins 54 are spaced closer together. Third zone 64 is located at the bottom of radial flow column 50, which is the sludge layer of the wastewater. Fins 54 of third zone 64 are spaced apart to allow for larger open slot areas 56, which allows for removal of the sludge.

Figure 5:
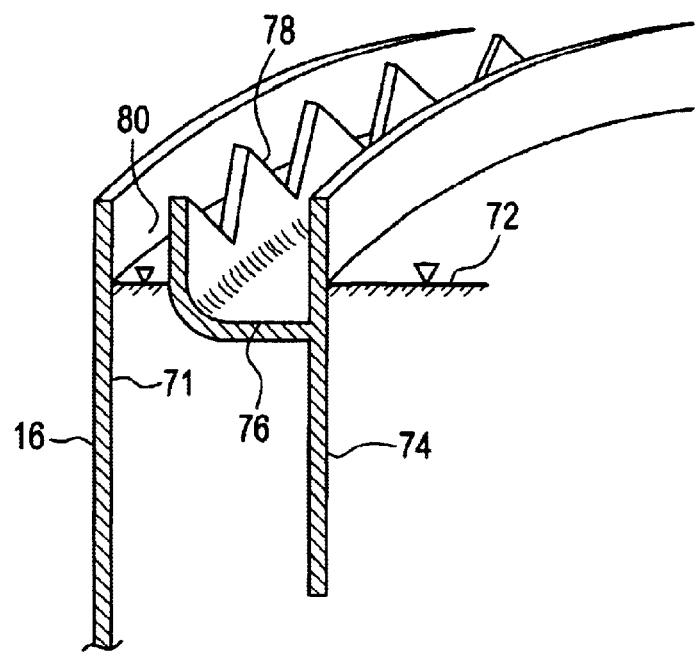
FIG. 5 is a perspective view of a weir of the radial flow septic tank of FIG. 1.

Referring to FIGS. 1, 2, and 5, an exemplary embodiment of outlet 32 is illustrated. Outlet 32 is a collection device that is located adjacent to and along an inside perimeter 71 of wall 16. In an exemplary embodiment, outlet 32 includes an overflow weir 70 that may float within the liquid level 72 of within main body 12. Overflow weir 70 includes a scum baffle 74 and a channel 76 having a triangular side 78. Overflow weir 70 conforms more or less to the shape of the tank and has a length that is smaller than inside perimeter 71 of wall 16. As a result, a channel 80 is created between wall 16 and triangular side 78 of channel 76.

Scum baffle 74 extends vertically within cavity 22 of main body 12 a sufficient distance to inhibit scum from entering the outlet 32. For example, scum baffle 74 may extend about six inches to about one foot below top 36 of wall 16. Scum baffle 74 holds back the scum from entering level channel 76. Scum baffle 74 may be shorter than typical scum baffles, which generally extend to approximately mid-depth of the tank because of the larger surface area within main body 12. The larger surface area provides more area for the storage of scum and thus, the scum level is not as deep as in the typical septic tank.

Overflow weir 70 is level and maintains a level position due to the buoyancy of overflow weir 70 and liquid level 72 within main body 12. Channel 76 is located at the same level or higher as outlet pipe 42 and is connected with outlet pipe 42 with a flexible pipe 73. Overflow weir 70 is also secondarily supported at inside perimeter 71 with a system of hooks 75, hangars, or the like, so that when septic tank 10 is pumped out, overflow weir 70 is supported within septic tank 10. Hooks 75 only operate to support overflow weir 70 when tank 10 is pumped out.

Radial flow septic tank 10 operates as follows. Wastewater, which contains solids and liquid, flows through inflow pipe 34 to center inflow discharge pipe 40. As the wastewater leaves inflow discharge pipe 40, the wastewater enters radial flow column 50, which distributes flow radially and equally within cavity 22. The wastewater then travels radially outward to wall 16. As the wastewater flows towards wall 16, solids settle out of the liquid and scum floats on top. Thus, as wastewater flows radially through septic tank, wastewater becomes treated wastewater. When the treated wastewater reaches wall 16, treated wastewater flows to channel 80 between overflow weir 70 and wall 16 and flows through triangular side 78 into channel 76. Scum baffle 74 prevents scum from entering channel 76. Accordingly, treated wastewater flows through channel 76 to outlet pipe 42 by gravity. The treated wastewater then flows to outlet pipe 42 and to the leachfield (not shown).

Figure 6:
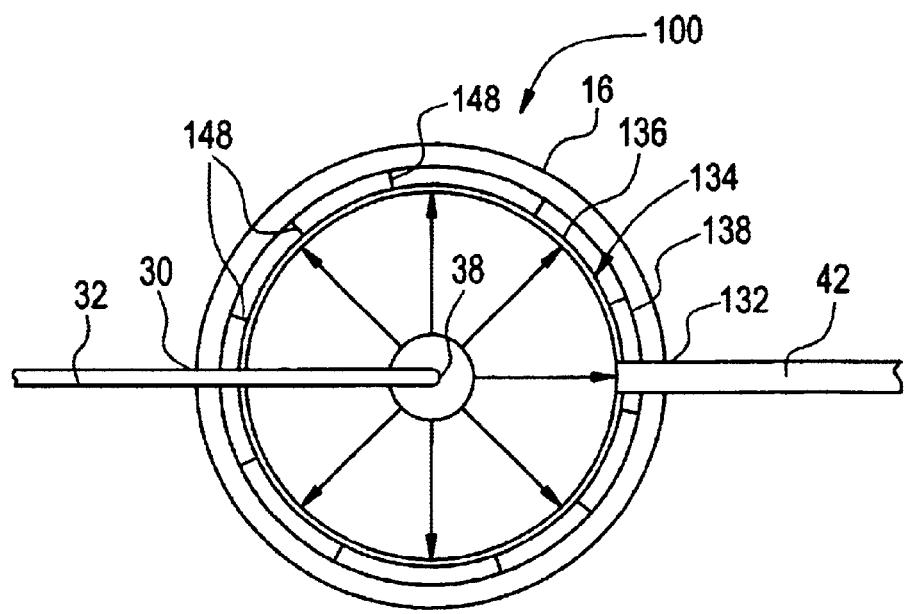
FIG. 6 is a plan view of an alternative embodiment of the radial flow septic tank of FIG. 1 with an outlet manifold.
Figure 7:
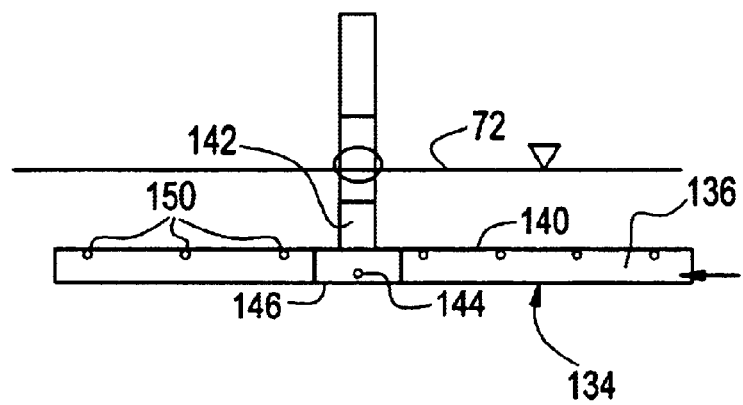
FIG. 7 is a side view of a portion of the outlet manifold of FIG. 6.

Referring to FIGS. 6 and 7, an alternative exemplary embodiment of radial flow septic tank 100 is illustrated. Radial flow septic tank 100 has an outlet 132 that is an alternative collection device that is located adjacent to and along an inside perimeter 71 of wall 16. Outlet 132 includes an outlet manifold 134. Outlet manifold 134 includes a pipe 136 that is located at or adjacent to inside perimeter 71 of wall 16. Pipe 136 may be located at any elevation along wall 16; however, a top 140 of pipe 136 should be located below the scum layer, which would be at least 3 inches below top 36 of wall 16. Pipe 136 is also located below the level of outlet pipe 42, which is located above liquid level 72 within main body 12. A connection pipe 142 connects pipe 136 to outlet pipe 42. Connection pipe 142 extends vertically from pipe 136 to cover 14 (see FIG. 1) and is also used as a cleanout for flushing pipe. A drain hole 144 is located at a bottom 146 of pipe 136 at the location of where pipe 136 connects to connection pipe 142. Pipe 136 is secured to wall 16 at a consistent level by a system of hangars 148, hook, brackets, or the like.

Pipe 136 includes holes 150 that are approximately ⅛ inch to about ¼ inch in diameter. Holes 150 should be spaced out evenly along pipe 136 to allow for an even flow into pipe 136 and also to create the radial flow with septic tank 10. In an exemplary embodiment, holes 150 are offset from top 140 of pipe 136 towards wall 16. This enables pipe 136 to deflect rising gas bubbles away from holes 150. By having holes 150 offset from top 140, holes 150 also serve as a gas baffle.

Estimated flow into pipe 136 is based on flow through a submerged orifice, as is known in the art of fluid mechanics. The head loss across holes is a function of the shape of holes, hole diameter, and velocity of liquid. Thus, the number and location of holes 150 can be varied so long as flow is equalized along pipe and the desired flow at outlet pipe 42 is attained. The use of larger holes increases the size of suspended solids that can enter pipe. If smaller holes are used, then the number of holes should increase.

Figure 8:
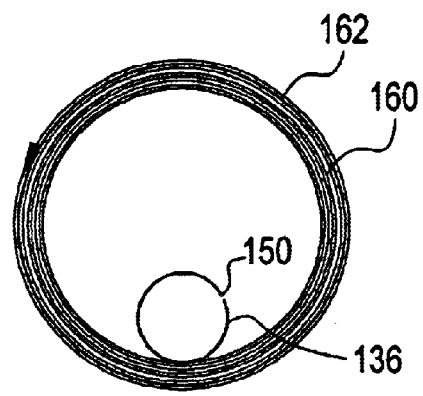
FIG. 8 is a cross-sectional view of the outlet manifold of FIG. 6 with a corrugated pipe.

Referring to FIG. 8, pipe 136 may also be contained within a corrugated pipe 160. Corrugated pipe 160 may be wrapped with a filter fabric 162, which includes a geosynthetic fabric or the like. Fabric 162 is preferably wrapped on the outside of corrugated pipe 160. Fabric 162 should have a structural support to insure that the entire surface of fabric 162 is available for transfer of liquid into holes 150. Fabric 162 reduces the potential clogging of holes 150 and helps prevent suspended solids from traveling to the leachfield. When using fabric 162, smaller diameter holes 150 may also be included in pipe 136 because of the reduced likelihood of suspended solids entering pipe 136.

Outlet manifold 134 operates as follows. Wastewater radially flows to wall 16, as described above. Once wastewater reaches pipe 136, treated wastewater enters pipe 136 through holes 150. The treated wastewater then flows through pipe 136 to connection pipe 142 into outlet pipe 42 to the leachfield. Outlet manifold 134 reduces solids discharged from main body 12 because pipe 136 is located at the clear layer within main body 12. In the event that corrugated pipe 160 and fabric 162 are utilized, outlet manifold 134 will operate in the same manner, except that the flow of the treated wastewater flows through fabric 162 into corrugated pipe 160 into holes 150 and then into pipe 136.

Due to the environment with septic tank 100, fabric 162 may have biological slimes build up on fabric 162. Fabric 162 can be cleaned by inserting a pressure jet into connection pipe 142 and into pipe 136. A low concentration solution of hydrogen peroxide can be injected through pressure jet into pipe 136 while simultaneously restricting the flow through outlet pipe 42. The flow of the solution is set at a rate that ensures the oxidation of the biological slimes on fabric 162.

Radial flow septic tank 10 improves the treatment of wastewater within the septic tank. One of the primary functions affecting treatment efficiency in the septic tank is the velocity of the effluent traveling through the tank. When the velocity of the effluent is slower, there is a greater tendency that solids will be able to settle out of the effluent.

The velocity is related to the quantity of flow and the cross-sectional area. Thus, flow through the septic tank is governed by the continuity equation of $$Q=A \times V$$

"Q" equals the flow in the septic tank. "A" equals the cross-sectional area of the septic tank. "V" equals the velocity of the effluent in the septic tank.

As is evident from the continuity equation, the flow is directly proportional to the area and velocity. Therefore, if the flow remains constant, then increasing the cross-sectional area will decrease the velocity. The following is an example comparison of the cross-sectional area available in a rectangular tank as compared to a radial tank:

A. Rectangular Septic Tank
  1. Tank Volume: 1000 gal.
  2. Rectangular Tank Dimensions: 8.0 feet length×4.33 feet width×4.08 feet height (Typical liquid inside tank dimensions, and assuming no sludge accumulation on the bottom)
  3. Q=AV, therefore V=Q/A
  4. The flow, Q, is constant
  5. Cross-sectional area: A=w×h=4.33 feet×4.08 feet= 17.67 square feet B. Radial Flow Septic Tank
  1. Tank Volume: 1000 gal.
  2. Assumed Circular Tank Dimensions: 7.0 feet diameter×3.2 feet height (Typical liquid dimensions, sludge accumulation would not change the height dimension)
  3. Q=AV, therefore V=Q/A
  4. The flow, Q, is constant
  5. Cross-sectional area:

$$A = \text{circumference} \times h$$
$$= \P d \times h = \P \times 7.0 \text{ feet} \times 3.2 \text{ feet}$$
$$= \underline{70.37 \text{ square feet}}$$

The resulting cross-sectional area from the radial flow septic tank is four times greater than the traditional rectangular tank. Thus, assuming that the flow, Q, is constant, a comparison of the velocities of the rectangular tank versus the radial tank is as follows:

$$Q=A_{rect} \times V_{rect} \text{(rect=rectangular tank)}$$

$$Q=A_{circ} \times V_{circ} \text{(circ=circular tank)}$$

Therefore: $A_{circ} \times = A_{rect} \times V_{rect}$ $$V_{circ}=(A_{rect} \times V_{rect})/A_{circ}$$

$$V_{circ}=(17.67 \text{ ft}^2 \times V_{rect})/70.37 \text{ ft}^2$$

$$V_{circ}=0.25 V_{rect}$$

Due to the greater cross-sectional area for radial flow septic tank, the resulting velocity is 75% less than the rectangular tank velocity. The slower velocity allows for better settlement of solids from the wastewater, and allows for better treatment of the wastewater before the wastewater exits the tank and flows to the leachfield. Moreover, the accumulation of solids does not decrease the cross-sectional area, and thus, does not affect the velocity within the radial flow septic tank.

As discussed, the advantages of radial flow septic tank 10 are that the cross-sectional area of the tank is greater, thereby reducing the velocity of the wastewater within the tank. By locating inlet 30 at approximately center 38 of tank 10 and by locating outlet 32 along inside perimeter of wall 16 of tank 10, a radial flow within tank 10 is achieved. Both overflow weir 70 and outlet manifold 134 are examples of outlet 32, which are collection devices that are located along inside perimeter 71 of wall 16. Moreover, radial flow column 50 helps to direct flow from inlet 30 in an outward direction towards inside perimeter 71 of wall 16. If radial flow column 50 extends from cover 14 to floor 20, then radial flow column 50 also has the advantage of providing structural support to cover 14 of septic tank 10. This is an advantage over the prior art tanks in which the inlet is located at a first end of the tank and the outlet is located at an opposing end of the tank, thereby creating flow across the tank rather than radially within the tank. As explained above, the radial flow allows for a greater cross-sectional area for the flow, thereby decreasing the velocity with tank 10.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A radial flow septic tank comprising:
  a main body having a wall and a floor defining a cavity;
  an outlet having a collection device disposed around an inside perimeter of said wall of said main body;
  a column disposed within said cavity at approximately a center of said main body; and
  an inlet in fluid communication with said column,
  wherein said column has at least a first zone and a second zone, said first zone having a first set of openings, said second zone having a second set of openings, said first set of openings being larger than said second set of openings.

2. The septic tank of claim 1, wherein said inlet includes an inflow pipe in operable communication with an inflow discharge pipe, said inflow pipe extends from said wall to said column, and said inflow discharge pipe is disposed vertically in said column.

3. The septic took of claim 1, wherein said column is a structural column and extends from a top of said main body to said floor, said column supports a cover.

4. The septic tank of claim 1, wherein said first set of openings arc defined by a first plurality of fins having a first space between each fin and said second set of openings are defined by a second plurality of fins having a second space between each fin, said first space is larger than said second space.

5. The septic tank of claim 1, wherein said collection device includes an outlet manifold in operable communication with an outlet pipe, said outlet manifold includes a pipe having holes disposed in said pipe.

6. The septic tank of claim 5, wherein said holes are about ⅛ inch to about ¼ inch in diameter.

7. The septic tank of claim 5, wherein said holes are disposed offset towards said wall from a top of said pipe.

8. The septic tank of claim 5, wherein said outlet manifold connects said outflow pipe via a connection pipe, said connection pipe is disposed vertically within said cavity.

9. The septic tank of claim 1, wherein said collection device includes en overflow weir in operable communication with an outlet pipe.

10. The septic tank of claim 9, wherein said overflow weir is disposed adjacent to an inside perimeter of said wall, creating a channel between said inside perimeter of said wall and said overflow weir.

11. The septic tank of claim 9, wherein said overflow weir includes a scum baffle.

12. The septic tank of claim 1, wherein said main body further comprises a sloping bottom wall disposed between said wall and said floor.

13. The septic tank of claim 1, wherein said column has a third zone, said third zone having a third set of openings, said third set of openings being larger than said second set of openings.

14. A radial flow septic tank comprising:
   a main body having a wall and a floor defining a cavity;
   an outlet having a collection device disposed around an inside perimeter of said wall of said main body;
   a column disposed within said cavity at approximately said center of said main body, said column having openings to allow said flow to move from said inlet to said outlet; and
   an inlet in fluid communication with said column,
   wherein said collection device includes an outlet manifold in operable communication with an outlet pipe, said outlet manifold includes a pipe having holes disposed in said pipe, and said outlet manifold is disposed in a corrugated pipe.

15. The septic tank of claim 14, wherein said corrugated pipe is wrapped with a filter fabric.

16. An outlet manifold disposed in a septic tank, said outlet manifold comprising:
   a first pipe having holes disposed in said first pipe, said first pipe configured to be disposed along an inside perimeter of a wall of the septic tank; and
   said first pipe is disposed in a corrugated pipe.

17. The outlet manifold of claim 16, wherein said holes are about ⅛ inch to about ¼ inch in diameter.

18. The outlet manifold of claim 16, wherein said corrugated pipe is wrapped with a filter fabric.

* * * * *